(12) United States Patent  
Fukushima et al.

(10) Patent No.: US 6,831,732 B2  
(45) Date of Patent: Dec. 14, 2004

(54) PRINTER

(75) Inventors: Itaru Fukushima, Tokyo (JP); Satoshi Yamanushi, Nirasaki (JP); Yuuki Horigome, Kofu (JP); Takehiko Saito, Kofu (JP)

(73) Assignee: Nisca Corporation, Yamanashi-Ken (JP)

( * ) Notice: Subject to any disclaimer, the term of this patent is extended or adjusted under 35 U.S.C. 154(b) by 198 days.

(21) Appl. No.: 09/964,503

(22) Filed: Sep. 28, 2001

(65) Prior Publication Data

US 2002/0039177 A1 Apr. 4, 2002

(30) Foreign Application Priority Data

Oct. 4, 2000 (JP) ........................................ 2000-304695

(51) Int. Cl.[7] ................ G03B 27/00; G03B 27/32; G03C 1/72
(52) U.S. Cl. ................ 355/406; 355/27; 430/138
(58) Field of Search ................ 355/406, 40, 27, 355/41; 399/367, 368, 370, 364, 333; 271/3.13; 430/138

(56) References Cited

U.S. PATENT DOCUMENTS 5,316,883 A * 5/1994 Eto et al. .................. 430/138
6,243,157 B1 * 6/2001 Tsuzawa .................... 355/40
6,256,473 B1 * 7/2001 Kamanuma et al. ........ 399/367
6,539,196 B2 * 3/2003 Ota et al. ................... 399/333

FOREIGN PATENT DOCUMENTS

JP  5-97305      4/1993
JP  2000-147678  5/2000

* cited by examiner

Primary Examiner—Peter B. Kim  
(74) Attorney, Agent, or Firm—Manabu Kanesaka

(57) ABSTRACT

A printer comprises for forming an image on a surface of a recording medium includes a preprocessing means for preprocessing the surface of the recording media to form an image on the surface of the recording media; post-processing device for post-processing the surface of the recording medium preprocessed by the preprocessing device; a recording medium feed path formed between the preprocessing means and the post-processing means; a first feed device arranged on an upstream side of the recording medium feed path; and a second feed device arranged on a downstream side of the recording medium feed path. The first feed device and the second feed device are made different in driving control from each other. For printing a plurality of recording medium successively, no large-scale arrangements are provided for printing processes to meet a required printing accuracy and to shorten a processing time.

12 Claims, 3 Drawing Sheets

PRINTER

BACKGROUND OF THE INVENTION

1. Field of the Invention

The present invention relates to a printer for printing images and the like on recording medium such as photosensitive recording sheets, particularly to a printer for printing on a plurality of recording medium effectively and continuously.

2. Description of the Prior Art

In prior printers, a photosensitive recording sheet is exposed to light before pressing it to develop, thereby forming an image on a surface of the photosensitive recording sheet. As an example, Japanese Patent Application Publication 2000-147678(A) discloses a recording apparatus such that: a photosensitive recording sheet called the Cycolor media is used that is formed of lamination of microcapsules filled with either one of coloring materials of cyan, magenta, and yellow each; the photosensitive recording sheet has a light of desired wavelength irradiated to a surface thereof to expose a color image; in other words, the surface is made to react to a light of specific wavelength to cure a sensitive material filled in the microcapsule together with the coloring material; the curing makes coloring reaction of the coloring material inactive; after that, a high pressure is applied to the active microcapsule without reacting to the light of specific wavelength to destroy for development (coloring), thereby forming the color image.

The prior printer mentioned above has an advantage that a running cost for printing can be kept low as consumable materials such as toner and ink or ink ribbon are not needed except for the above-mentioned Cycolor media only for forming, or printing, the color image. However, it has a problem pointed out that it takes a long time to print on a single photosensitive recording sheet (Cycolor media) as the pressing and developing processes have to be made after some stabilization time called the dark time required after the exposing process.

To shorten the processing time, the above-mentioned prior printer is modified to make the sheet feeding and exposing processes in such a parallel way that a plurality of retaining tables for holding the photosensitive recording sheet is formed of a polyhedron, and the retaining tables form a cyclic arrangement having a feedable first position for feeding the recording sheet, a second position for exposing the image to the fed recording sheet, and a dischargeable third position. The method can shorten the process time for the plurality of photosensitive recording sheets while allowing for the dark time.

However, even the above-described prior art has problems still that the apparatus is made large as wide space is needed in the apparatus for containing the plurality of retaining tables formed of polyhedron, and also an additional driving arrangement for operating the cyclic arrangement is needed, and further a complicated control system is needed for the cyclic operation of the plurality of retaining tables. As a result, it would be involved in high apparatus manufacturing cost, or cost increase.

With respect to shortening a continuous process time for a plurality of media, various prior art has been disclosed and is available in a variety of fields and apparatuses. As an example, Japanese Patent Application Publication Hei 5-97305(A) discloses a technique capable of making a processing speed higher, or shorten a processing time, by using a sheet inversing unit having a switchback path that controls a feed timing for the sheets fed successively, thereby allowing overlapping feed of the successive sheets on the switchback path.

OBJECT OF THE INVENTION

An object of the present invention is to provide a printer for printing a plurality of recording media successively that no large-scale arrangements are provided for printing processes to meet a required printing accuracy and to shorten a processing time.

Another object of the present invention is to provide a printer of low price by way of suppressing apparatus manufacturing costs with use of simple feed driving arrangements and controls.

Still another object of the present invention is to provide a printer that no large-scale arrangements are provided for printing processes to meet a required printing accuracy and to shorten a processing time.

SUMMARY OF THE INVENTION

Briefly the foregoing objects are accomplished in accordance with aspects of the present invention by a printer, comprising in combination for forming an image on a surface of a recording medium: preprocessing means for preprocessing the surface of the recording medium to form an image on the surface of the recording medium; post-processing means for post-processing the surface of the recording medium preprocessed by the preprocessing means to form the image on the surface of the recording medium; a recording medium feed path formed between the preprocessing means and the post-processing means; first feed device arranged on an upstream side of the recording medium feed path; and, second feed device arranged on a downstream side of the recording medium feed path; wherein the first feed means and the second feed device are made different in driving control from each other. Driving supply to the second feed device may be run while driving supply to the first feed device is stopped, thereby feeding the preceding recording medium to the post-processing means.

The printer further comprises in combination: a switchback section for substantially extending the recording medium feed path wherein the second feed means is provided in the switchback section. The switchback section has a switchback path installed therein vertically and the second feed means is arranged on the switchback path and has a switchback driving arrangement for independently driving the second feed means.

A switching gate is provided between the first feed means and the second feed device on the recording means feed path for switching a feed direction for the recording medium, the switching gate being movable between a first position for guiding the recording medium fed by the second feed device to the post-processing means and a second position for opening the upstream side and the downstream side on the recording medium feed path for allowing the recording medium to be transferred from the first feed device to the second feeding means. The second feed device may comprise a reversible feed roller and the switching gate may be positioned at the first position in synchronous with either of normal or reverse rotation of the feed roller.

The preprocessing means may have an exposing section for making exposure on the recording medium and the post-processing means may have a developing section for making development by pressing the recording medium having the exposure made thereon by the exposing section. It is preferable that the developing section has a pressure roller for pressing the recording medium at a specific pressure and for feeding the recording medium and a feed speed of the recording medium fed by the pressure roller is slower than a feed speed of the recording medium fed by the first and second feed means.

The printer further comprises in combination: a cutting section for cutting edges of the recording medium developed by the developing section and third feed device for feeding to the cutting section the recording medium developed by the developing section. It is preferable that a feed speed of the recording medium fed by the third feed device is faster than a feed speed of the recording medium fed by the pressure roller. The feed speed of the recording medium fed by the first and second feed means may be virtually same as the feed speed of the recording medium by the third feed means.

The foregoing and other objects, advantages, manner of operation and novel features of the present invention will be understood from the following detailed description when read in connection with the accompanying drawings.

DESCRIPTION OF THE PREFERRED EMBODIMENTS

The following describes in detail an embodiment of the printer according to the present invention in reference to the drawings attached here.

The printer according to the present invention includes an ink jet printer, a laser printer, and similar printing apparatuses. This embodiment described is for a printer appropriate for Cycolor film (hereinafter referred to as the Cycolor printer), and the Cycolor film is a photosensitive recording sheet.

First, an overview of the Cycolor printer embodied according to the present invention is described below.

Figure 1:
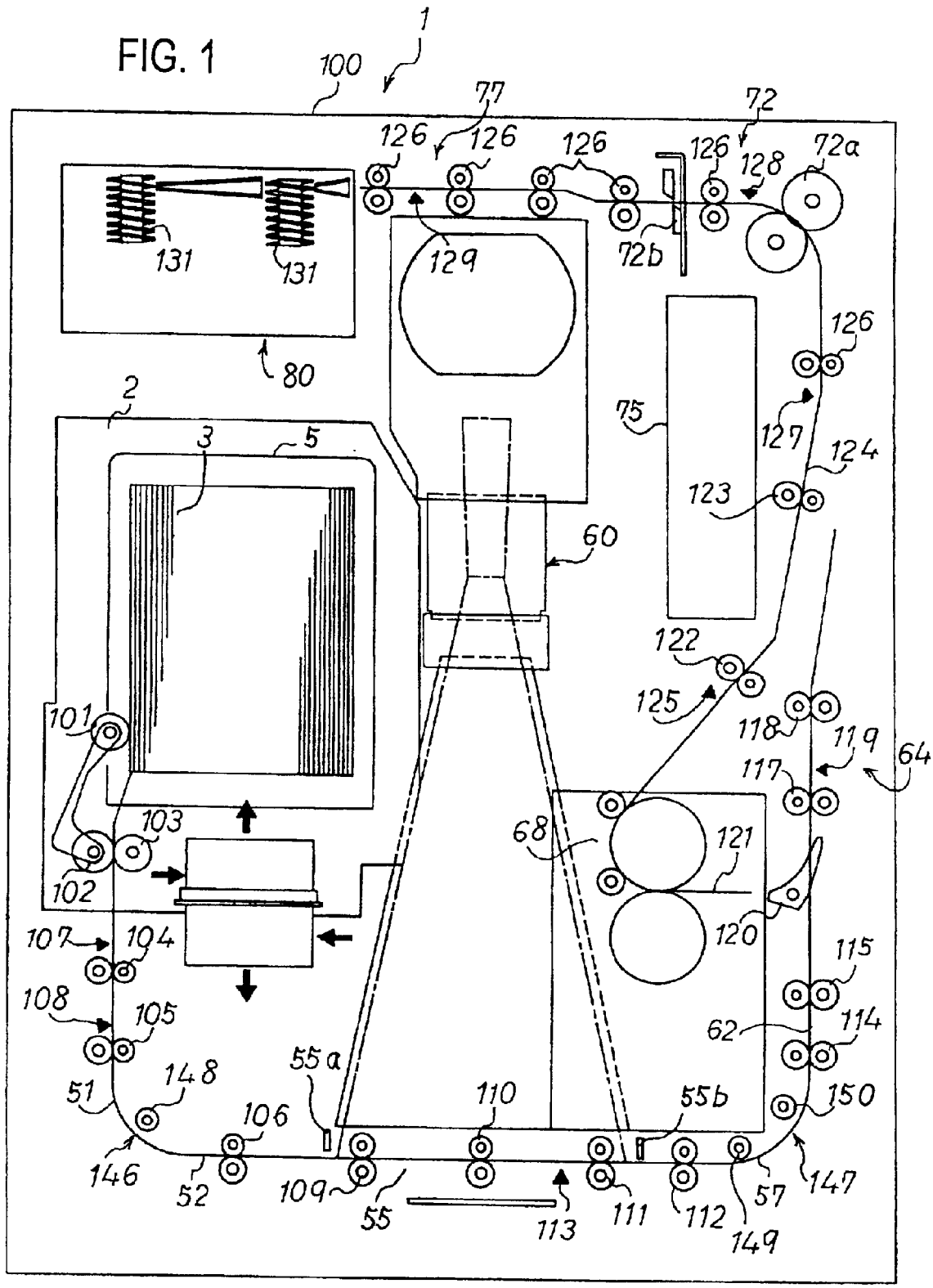
FIG. 1 is a front overview for an entire structure of the printer in an embodiment of the present invention.

FIG. 1 is a front view illustrating the Cycolor printer 1. A top and a bottom of the figure correspond to those of an apparatus housing 100, and a right and left sides are to those of the apparatus housing 100.

A media container for media 3, including recording media and film, is arranged in an upper area of the apparatus housing 100. A medium unloading port for the medium 3 is arranged closed to the medium container, on the top of the apparatus housing 100. A feed path is formed from the media container to the medium unloading port. Along the feed path are disposed processing sections, including an exposing section, a developing section, and a fixing section. The feed path is disposed in a loop manner inside the apparatus housing 100 as wrapping the processing sections. Parts of the feed path are sharply curved, including a switchback section 64 and a alternative path 121 that will be described later. Such a construction allows every processing section to have space enough to make a single medium stay therein.

The medium container has a cassette room 2 disposed on a side of the apparatus housing 100, on an upper left side in the figure. The cassette room 2 can load a media cassette 5 therein from a front side in the figure. The media cassette 5 is capable of containing a many number of media 3 for forming desired images. For loading the many number of media 3, they are put downward into the media cassette 5, vertically in the apparatus housing 100 (printer 1). In other words, the many number of media 3 can be loaded so that they can be linearly fed out of the media cassette 5 to the feed path without changing their direction.

Loading the media cassette 5 in the media container, or the cassette room 2, makes synchronization with a medium picking arrangement (not shown) to run a pick roller 101. The pick roller 101 is pressed to the medium 3 in the media cassette 5. At the same time, a medium pressing arrangement (not shown) is run to press the medium 3 in the media cassette 5 to the pick roller 101. As a result, the pick roller 101 can keep feeding the media 3 in the media cassette 5 one by one in sequence.

The cassette room 2 also has a media separating arrangement disposed therein for preventing more than one sheet of the media 3 fed by the pick roller 101 from being fed out to a feed path 51 (which will be described later) at the same time. The medium separating arrangement is formed of a pick roller 101 and a separating roller 103 faced and pressing each other. The feed roller 102 is controlled in rotation so as to feed out the medium 3 toward the feed path 51, while the separating roller 103 is controlled in rotation so as to draw back the medium 3 toward the pick roller 101. The feed roller 102 in the embodiment is controlled to have greater drive force (torque) than the separating roller 103. Such a medium separating mechanism can separate the media 3 fed by the pick roller 101 one by one before feeding to the feed path 51.

The medium 3 is formed of a viscous layer having polyester film coated with a bonding layer and containing numbers of photosensitive microcapsules called Cyliths and a transparent PET (polyethylene terephthalate) layer covering it.

Each of the microcapsules is filled with a photosensitive agent reactive to a different wavelength and either one of dyes of CYM (cyan, yellow, and magenta). The microcapsule containing the cyan dye is cured with a red light received, that of the yellow dye with a blue light, and that of the magenta with a green light. Microcapsules being not reactive to lights of specific wavelengths and ones receiving no lights cannot be cured. Such microcapsules and a developing and fixing agent called the developer resin are bound to a special oily viscous agent to form the viscous layer.

Thus, when exposure is made by an exposing projector (which will be described later), red exposure portions have only the cyan dye cured, leaving the other dyes not cured. When a high pressure is applied by a developing roller arranged on the downstream end, the microcapsules containing the yellow dye and the magenta dye are disrupted, resulting in appearance of the red color. Similarly, green exposure portions have only the magenta dye cured, and the microcapsules containing the cyan dye and the yellow dye are destroyed, resulting in appearance of the green color. Blue exposure portions have only the yellow dye cured, and the microcapsules containing the cyan dye and the magenta dye are disrupted, resulting in appearance of the blue color.

The microcapsule is of a few microns of size. An LCD (liquid display panel) used for printing contains a few capsules per pixel. A curing degree of a microcapsule differs with an amount of exposure. These mean that an image of numbers of color gradations can be formed with each microcapsule cured and disrupted depending on color data of each pixel.

A temperature controlling means (not shown) is disposed at the bottom of the cassette room 2 for controlling environment inside the media cassette 5. In the embodiment is used a Peltier device providing a Peltier effect that can produce temperature difference depending on direction of a current flowing at a junction of dissimilar metals thereof. The Peltier device can be set for either of heating or cooling by controlling the polarity of the voltage applied to the junction. The effect can be utilized to optimize the temperature and humidity inside the medium cassette 5.

Below the feed path 51 is arranged the feed path 51 for feeding the medium 3 fed out of the medium cassette 5. The feed path 51 is directed down from the media cassette 5 toward a bottom of the apparatus housing 100 before being extended along the bottom of the apparatus housing 100 to an exposure path disposed along the bottom.

The medium cassette 51 has a plurality of feed rollers (two pairs of feed rollers 104 and 105 in this embodiment) arranged therealong. An error detecting sensor 107 is disposed upstream in front of the paired feed rollers 104, and a medium detecting sensor 108 is disposed upstream in front of the paired feed rollers 105.

The error detecting sensor 107 is controlled to detects a state of the medium 3 and signals a feed error when a plurality of media 3 is not separated by the medium separating arrangement mentioned above before being fed out at the same time. In the operation, feeding of the medium 3 is stopped in synchronous with the feed error indication.

The medium detecting sensor 108 is controlled to detect a leading end edge of the medium 3 fed out of the feed path 51 via the paired feed rollers 104 before feeding out a leading end edge detection signal. In the operation, a medium feeding arrangement (not shown) stops the pick roller 101 and the medium separating arrangement, including the feed roller 102 and the separating roller 103, from rotating and allows only the paired feed rollers 104 and 105 according to the leading end edge detection signal. This can feed only single sheet of the medium 3 to the feed path 51. The sheet of medium 3 then is transferred to the exposure path. With the transference to the exposure path, the following sheet of medium 3 is fed from the media cassette 5 at a predetermined timing is stopped at a stand-by position (not shown) set in front of the exposure path. This assures the medium 3 can be transferred to the exposure path one by one.

The exposure path is formed of a pre-stage path 52 disposed in series to the feed path 51 for feeding downstream the medium 3 having passed through the feed path 51, an exposing stage 55 disposed downstream in series to the pre-stage path 52, and a post-stage path 57 disposed downstream in series to the exposing stage 55 for feeding the medium 3 having passed through the exposing stage 55.

The exposure path has a plurality of paired rollers therein for feeding downstream the medium 3 fed via the feed path 51. In the embodiment are disposed one pair of feed rollers 106 in the pre-stage path 52, three pairs of feed rollers 109, 110, and 111 in the exposing stage 55 at an equal interval, and one pair of feed rollers 112 in the post-stage path 57.

The exposing stage 55 has a medium detecting sensor 113 disposed between the two pairs of feed rollers (between the paired rollers 110 and 111 in the embodiment). According to a sensor signal of the medium detecting sensor 113, the medium 3 can be halted once at an exposure position on the exposing stage 55. In detail, the medium detecting sensor 113 sends the sensor signal out if the medium 3 is put at the exposure position on the exposing stage 55 with the medium 3 fed on the exposing stage 55 via the pre-stage path 52. At that time, the paired rollers 109, 110, and 111 are controlled to stop from rotating in synchronous with the sensor signal.

In the state that the medium 3 is halted once the medium 3 is exposed separately to three primary color lights, including R (red), G (green), and B (blue), on a printing side 3*a* thereof (FIG. 2) for a preprocess to form a desired image. It should be noticed that mylar light shields 55*a* and 55*b* are arranged on the upstream end and the downstream end of the exposing stage 55 respectively. The light shields 55*a* and 55*b* prevent the printing side 3*a* of the medium 3 from being irradiated by external noise lights (disturbing lights) while exposure is made on the exposing stage 55. In addition, a heater (not shown) is disposed on the bottom of the exposing stage 55 to keep the temperature of the exposing stage 55 to a specific value. The heater can minimize heat radiation of the exposing stage 55.

An exposing projector 60 as exposure light source is disposed at a position, above around a center of the apparatus housing 100, facing the exposing stage 55. The exposing projector 60 irradiates light to the printing surface 3*a* of the medium 3 for a specific exposure process.

The exposing projector 60 and the exposing stage 55 in the embodiment are integrated together as an exposing section, or preprocessing means (first processing section) for preprocessing to form the image on the printing surface 3*a* of the medium 3.

Figure 2:
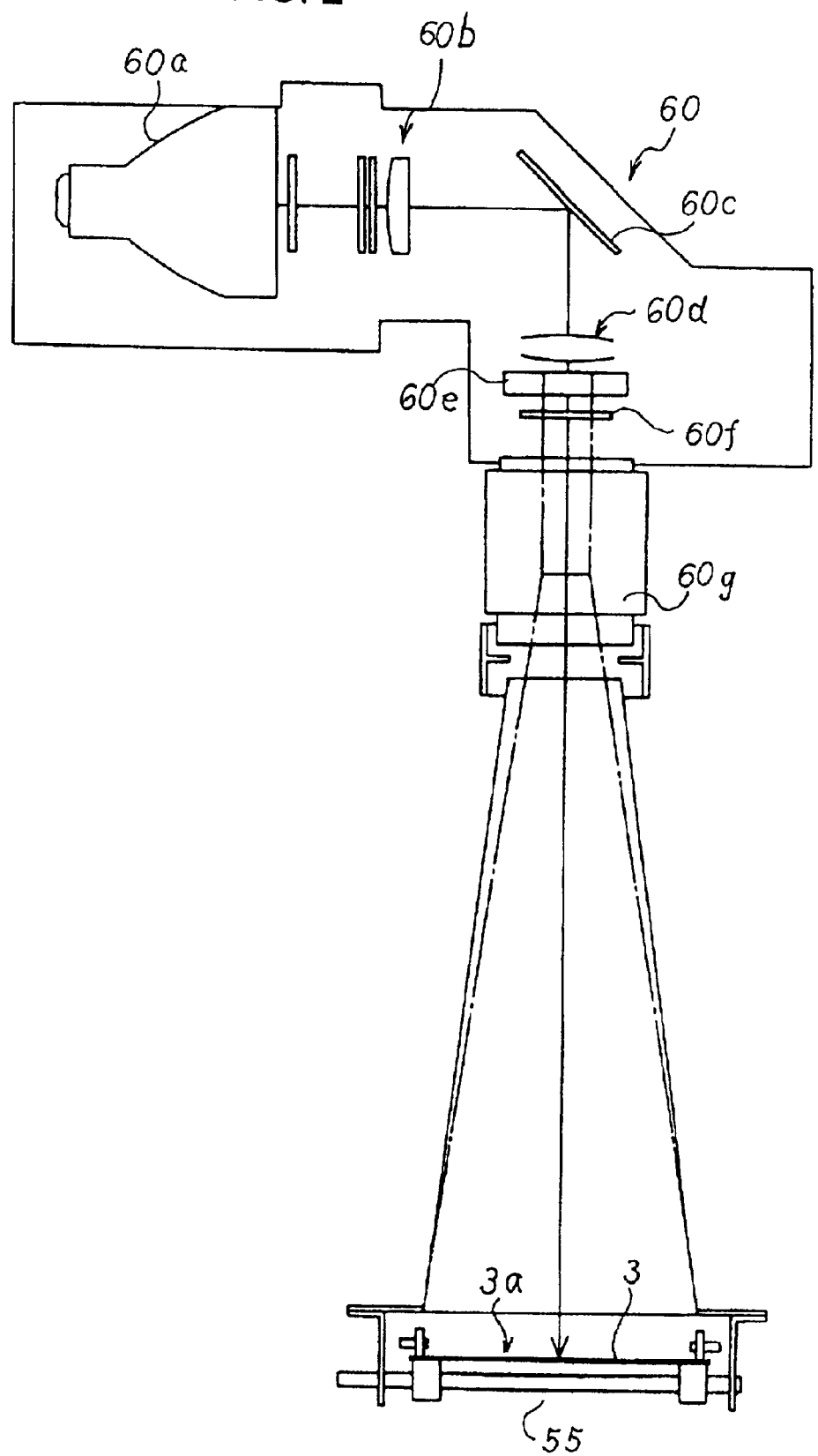
FIG. 2 is an overview for structure of an exposing projector.

In the exposing projector 60, as shown in FIG. 2, the light radiated from the light source 60*a* (metal halide lamp) is aligned to a parallel beam through a second optical system 60*b* (an optical system including a fly array lens and a polarization converter device). The parallel beam then is deflected downward, or toward the exposing stage 55, by a mirror 60*c* before passing a second optical system 60*d* having a field lens, a three-color RGB filter driven to rotate, and a wave plate. If the three-color RGB filter is rotated, color image patterns are formed through an LCD panel 60*e* in timing with respective R, G, and B lights. The image formed on the LCD panel 60*e* then is projected onto the printing surface 3*a* of the medium 3 on the exposing stage 55 via a deflecting plate 60*f* and a projecting lens 60*g*.

The medium 3 having such an exposure process made is transferred to the post-stage path 57 via the paired feed rollers 112 before being controlled to stay on the post-stage path 57 for a specific sensitizing time. The sensitizing time is a period of time needed to develop colors on the exposed medium 3 through a developing process (which will be described later) and optimized depending on the kind of medium 3, exposing time, and other factors. After the sensitizing time elapsed, the medium having stayed on the post-stage path 57 is transferred to a feed path 62 via paired feed rollers 114. It should be noticed that the post-stage path 57 is flexed upward (from the bottom to the top of the apparatus housing 100 and is connected with the feed path 62. The feed path 62 is extended upward inside the apparatus housing 100.

The 62 formed vertically with respect to the apparatus housing 100 has paired cleaning rollers 115 and switchback section 64 disposed therearound in the order. The exposed medium 3 is cleaned by the paired cleaning rollers 115 before being fed to the switchback section 64. In synchronous with feeding of the medium 3, a successive medium 3 is fed and positioned on the exposing stage 55.

The exposed medium 3 is controlled to stay in the switchback section 64 for a dark time needed for coloring by the developing process (which will be described later). In detail, the switchback section 64 has two pairs of feed rollers 117 and 118 arranged therein along the feed path 62. The feed path 62 between the paired feed rollers 117 and 118 has a medium detecting sensor 119 disposed thereon. If the exposed medium 3 being fed by the paired feed rollers 117 and 118 reaches a specific position, the medium detecting sensor 119 outputs an sensor signal. The paired rollers 117 and 118 are synchronized with the sensor signal to stop. The exposed medium 3 stays at the specific position in the switchback section 64 for the sensitizing time. For the sensitizing time, the exposed medium 3 being successively fed is made to stay on the feed paths 57 and 62 between the exposing stage 55 and the switchback section 64.

The feed path 62 in the switchback section 64 is extended upward inside the apparatus housing 100 before being broken at around a vertical center of the apparatus housing 100. The medium 3 made to stay at the specific position in the switchback section 64 is returned on the same feed path 62 and guided through an alternative path 121 branched from an inlet of the switchback section 64 to a paired pressure developing rollers 68 that is a developing unit (which will be described later).

Now, the following describes structure, operation, and advantages of the switchback section 64.

The medium 3 exposed on the exposing stage 55 continues photosensitization (exposure reaction) in the microcapsules thereof for a while even after the light irradiation stops. For the reason, the stabilizing time (dark time) for stabilizing the photosensitive reaction in the microcapsules is needed before the microcapsules are fractured by pressure of the paired pressure developing rollers 68. The stabilizing time can be obtained by making longer the feed path from the exposing stage 55 to the paired pressure developing rollers 68. However, arrangement must be made large due to the long feed path accordingly.

The switchback section 64 therefore is provided to make the medium switchback to obtain the dark time needed without making the apparatus large. The paired feed rollers 117 and 118 in the switchback section 64 are arranged so that they can be controlled to drive independently of the other paired rollers, including the paired feed rollers 112 and 114, the paired cleaning rollers 115, and the paired pressure developing rollers 68. Thus, the dark time for reaching the paired pressure developing rollers 68 can be changed, made longer or shorter, freely by adjusting the staying time of the medium 3 in the switchback section 64.

In other words, the embodiment uses separate driving controls: the control for the paired feed rollers 112 and 114 and the paired cleaning rollers 115 (first feed device) arranged on the upstream sides of the feed paths 57 and 62 from the above-mentioned exposing section to the paired pressure developing rollers 68 (developing section; and, the control for the paired feed rollers 117 and 118 (second feed device) arranged in the switchback section 64 on the downstream side of the feed path 62. This can make either one of the drivings start while the other being stop or the both drivings start or stopped to set the dark time to a desired value.

Figure 3:
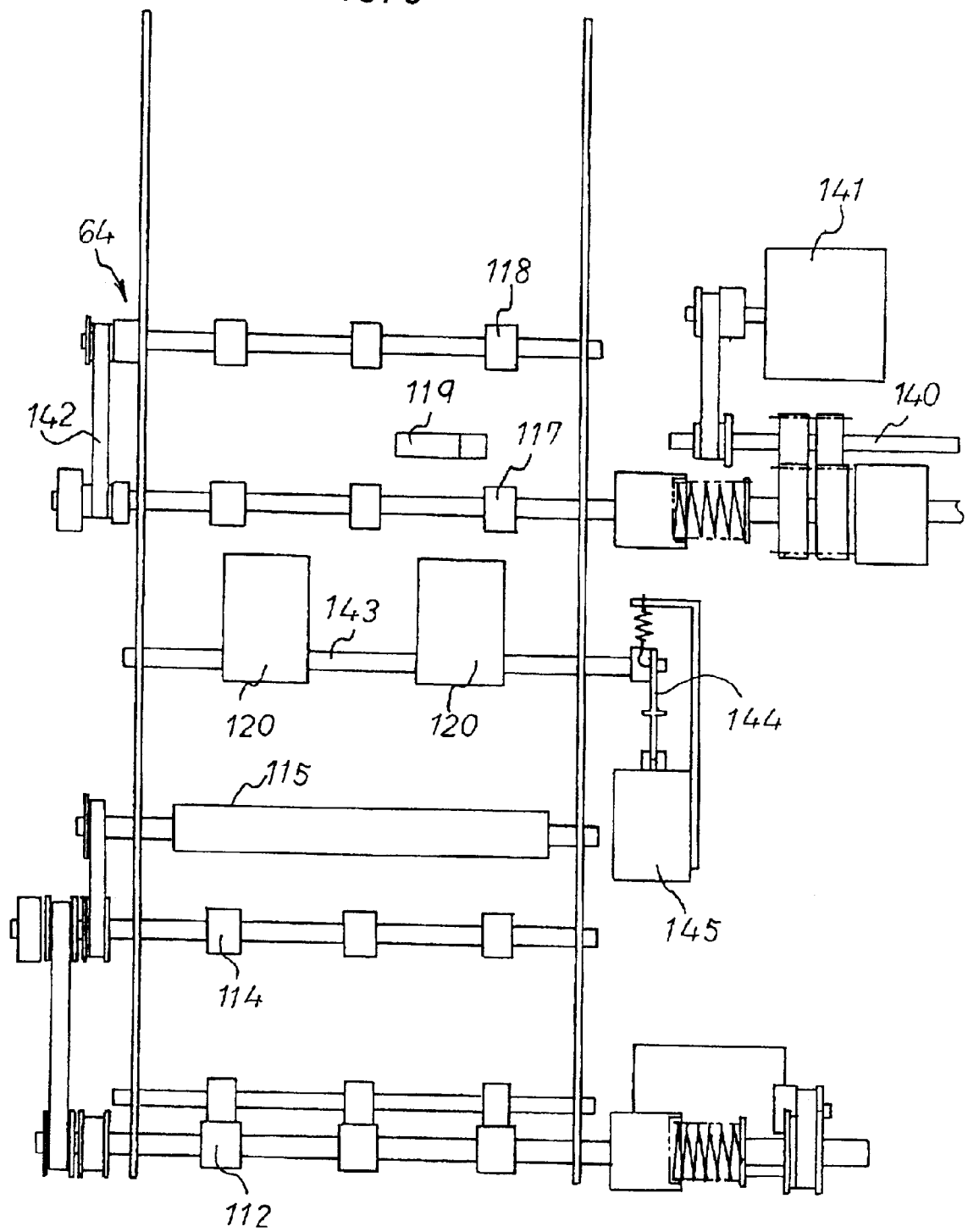
FIG. 3 is an overview for structure of a switchback section.

In detail, as shown in FIG. 3, the paired feed rollers 117 are connected to the motor 141 via the gear arrangement 140, and the paired feed rollers 117 and 118 are linked together by the endless belt 142. In the embodiment, a switchback driving arrangement is the general term for the paired feed rollers 117 and 118, gear arrangement 140, and the motor 141. The switchback driving arrangement alone can be controlled separately and independently of the other driving arrangement in the apparatus housing 100.

In such a construction, if the motor 141 is rotated, say, normally, the normal rotational motion is transmitted to the paired feed rollers 117 via the gear arrangement 140 to rotate the paired feed rollers 117 normally. The normal rotational motion of the paired feed rollers 117 is transmitted to the paired feed rollers 118 via the endless belt 142 to rotate paired feed rollers 118 normally as the paired feed rollers 117 and the paired feed rollers 118 are linked together by the endless belt 142. With the paired feed rollers 117 and 118 rotated normally, the medium 3 is taken onto the feed path 62 before being stopped at the specific position in the switchback section 64.

When the dark time elapses, the paired feed rollers 117 and 118 are controlled to rotate in reverse direction if the paired pressure developing rollers 68 are synchronized with the paired feed rollers 117 and 118 in the switchback section 64, that is, if no preceding medium 3 exists between the paired pressure developing rollers 68 for development. If the motor 141 is rotated inversely, the inverse rotational motion is transmitted to the paired feed rollers 117 via the gear arrangement 140 to rotate the paired feed rollers 117 and 118 inversely. As a result, the medium 3 is fed in the reverse direction on the same.

In the embodiment, a switching gate 120 is disposed on the feed path 62 between the paired feed rollers 117 and the paired cleaning rollers 115. The switching gate 120 is actuated in synchronous with the reverse rotations of the paired feed rollers 117 and 118, the reverse rotations being given by the switchback driving arrangement. The switching gate 120 is supported on the rotating shaft 143. The rotating shaft 143 is linked with the actuator 145 via the linking arrangement 144. The actuator 145 used in the embodiment is of a solenoid. The linking arrangement 144 converts the linear motion of the solenoid (actuator 145) to rotational motion to transmit to the rotating shaft 143. When the actuator 145 moves linearly in synchronous with the inverse control of the paired feed rollers 117 and 118, the linear motion is converted to rotational motion via the linking arrangement 144 to transmit to the rotating shaft 143. Rotation of the rotating shaft 143 makes the switching gate 120 swing to position on the feed path 62 to block the feed path 62. As a result, the medium 3 fed in the reverse direction on the feed path 62 is fed to the alternative path 121 via the switching gate 120 before being guided to the paired pressure developing rollers 68 with the printing surface 3a kept to direct up. The switching gate 120, when not in action, is placed at such a position that the medium 3 can be delivered from the paired cleaning rollers 115 arranged on the feed path 62 to the paired feed rollers 117 arranged in the switchback section 64.

The paired pressure developing rollers 68, as shown in FIG. 1, are arranged to rotate as the rollers press each other at a specific pressure. The exposed medium 3 in which the microcapsules have been cured has a load applied to both surfaces thereof when passing the 68 to destruct the microcapsules of hardness depending on amount of exposure. With the microcapsules of a specific hardness destructed, die (ink) in the microcapsules exudes out to develop, or color, the image. It is preferable that to complete the image forming (coloring) by destruction of the microcapsules, the paired pressure developing rollers 68 should be set at a low rate to apply enough load to the printing surface 3a of the medium 3. The paired pressure developing rollers 68 in the embodiment is set to 45 mm/sec of rotational speed, and the paired feed rollers 112 and 114, the paired cleaning rollers 115, and the paired feed rollers 117 and 118 of the switchback section 64 to 400 mm/sec of rotational speed, which is higher than that of the paired pressure developing rollers 68.

On the downstream of the paired pressure developing rollers 68 is extended the 121 to the top of the apparatus housing 100 along inside the apparatus housing 100. The alternative path 121 has a plurality of paired feed rollers (two pairs in the embodiment, 122 and 123) provided in a course thereof. The medium 3 having the development process made by the paired pressure developing rollers 68 is stabilized in the colorization while being fed on the alternative path 121 by the paired feed rollers 122 and 123.

In other words, the colorization needs some time (wait time) until the ink exudation stabilizes even after release of the pressure by the paired pressure developing rollers 68. To secure the wait time, it is preferable that length of the alternative path 121 should be made longer. It should be noticed that the alternative path 121 can be set to a desired length according to the switchback distance of the switchback section 64. This allows the wait time to be set depending on the kind of ink used.

On the upstream of the paired feed rollers 122 is disposed a medium detecting sensor 125. If a downstream edge of the medium 3 fed on the alternative path 121 passes the medium detecting sensor 125, a signal output of the medium detecting sensor 125 synchronizes a cutting arrangement 72 to run, which will be described later.

A high-speed feed path 124 is provided in connection with an end of the alternative path 121 and extended through a top right side of the apparatus housing 100 to an outlet placed on a top left side of the apparatus housing 100.

For the high-speed feed path 124 are provided paired high-speed feed rollers 126 and the cutting arrangement 72. The paired high-speed feed rollers 126 are controlled to rotate at the same rate as or a little faster than the feed rollers provided in the apparatus housing 100 except for the paired pressure developing rollers 68 at least. The cutting arrangement 72 is arranged on the top of the apparatus housing 100 (top right side looking on the drawing) and serves to cut four margins of the medium 3.

The cutting arrangement 72 has paired slitter rollers 72a provided for cut out the both right and left side margins of the medium 3 fed to come thereto and a cutter 72b for cutting out a leading and trailing end margins of the medium 3. In the embodiment is arranged the paired slitter rollers 72a on the upstream side of the high-speed feed path 124 and at the top corner of the apparatus housing 100 and is arranged the cutter 72b on the virtually horizontal path on the downstream side thereof. Alternatively, the cutter 72b may be arranged on the upstream of the high-speed feed path 124, and the paired slitter rollers 72a may be arranged on the downstream side thereof.

With the cutting arrangement 72, first the medium 3 is cut out on both right and left side margins of a leading half thereof by the paired slitter rollers 72a while being fed, second is halted and cut out on the leading end margin by the cutter 72b, third is restarted to feed and cut out on both right and left side margins of a trailing half thereof by the paired slitter rollers 72a, and fourth is halted again and cut out on the trailing end margin by the cutter 72b. For the cutting operation, a medium detecting sensor 128 is arranged in front of an upstream end of the cutter 72b to always sense the leading and trailing end positions of the medium 3 being fed on the upstream and downstream ends, thereby controlling timing of cutting out the leading end margin and the trailing end margin of the medium 3 by the cutter 72b. It should be noticed that the paired slitter rollers 72a are controlled to rotate at the same rate as the paired high-speed feed rollers 126.

Below the cutting arrangement 72 (higher portion of the apparatus housing 100) is arranged a containing section 75 for containing the margins cut out of the medium 3 therein, or the margin dust cut out by the cutting arrangement 72 drops into the containing section 75 to collect. In actual operation, the environment in the apparatus tends to generate static electricity as the atmosphere is at high temperature and the cut material is of polyester. The static electricity causes sticking of the cut margins when the margins of the medium 3 are cut by the paired slitter rollers 72a and the cutter 72b, resulting in hard dropping of the margins and sticking on the inlet. For the reason, it is preferable that the containing section 75 should have copper tape attached thereto to eliminate the static electricity or be formed of a metal conductive material.

The high-speed feed path 124 on the downstream end of the cutting arrangement 72 has a bleaching section 77 for bleaching process.

The following describes the bleaching process briefly.

The medium 3 exposed on the exposing stage 55 forms an image as necessary amount of die (ink) is exuded and pressed. To express variable densities, the medium 3 is exposed to intermediate amounts of light to make hardness of the microcapsules intermediate, thereby making the ink exudation intermediate. If the medium 3 is left in such a condition after pressing, the ink exudation proceeds. The medium 3 therefore cannot be fixed to a desired color. To prevent that, light is re-irradiated on the printing surface 3a of the medium 3 in the course of feeding from the cutting arrangement 72 to a post-heating section 80 (outlet, which will be described later). Such a process can completely cure the microcapsules that have not been fully cured yet. The printing surface 3a thus can keep stable print image for ages without color change.

The embodiment has the bleaching section 77 arrange with use of the space above the exposing projector 60. In view of the fact that considerable amount of the light emitted from the light source 60a of the exposing projector 60 (FIG. 2) is leaked out thereof, the bleaching section 77 is arranged at a position where the leaked light can be used, that is, a position above the exposing projector 60.

It should be noticed that the printing surface 3a of the medium 3 is directed upward in the bleaching section 77, or in a direction opposite to the light source 60a, as the medium 3 is reverted in the switchback section 64. For the reason, to irradiate the leaked light down to the printing surface 3a, a mirror (not shown) is arranged above the exposing projector 60. It is preferable to set the paired feed rollers arranged in the bleaching section 77 should be driven a little slower than the ones arranged in the other feed paths in view of fast continuous process of the medium 3, as the bleaching exposure has to be made for a specific time for a desired effect.

On the downstream end of the bleaching section 77, or at the top left side of the apparatus housing 100, is disposed the outlet in which the post-heating section 80 is arranged.

The post heating is to make a heating process for accelerating the coloring process as the coloring takes long time until the die (ink) develops its primary color. The post heat is made at 90 degrees C. for one minute to virtually saturate exudation of the die, thereby preventing color change afterwards.

Making the medium 3 stay on the feed path is limited in connection with the medium 3 for continuous printing process to form the image on the medium 3 and lowers the production capability as will be described later. For the reason, the post-heating section 80 in the embodiment is formed of a room for continuously stacking the medium 3 vertically at a specific position and a temperature control arrangement, including a sensor and a heater, for keeping the room at a specific temperature. The room temperature is controlled to the desired one of 90 degrees C. mentioned above.

The bleached medium 3 in the post-heating section 80 is led to paired retention guides (not shown) facing each other before position on lead screws 131. The lead screws 131 are at positions at which four corners of the medium 3 can be stably supported. In the state, the paired retention guides are saved away once before the lead screws 131 are rotated one turn to move the medium 3 down by one lead. The paired retention guides 83 then are returned to the medium bringing position to position the following medium 3 at the leads of the lead screws 131.

Such a repeated operation, including bringing the medium 3, positioning, and moving down, makes the medium 3 stay in the post-heating section 80. For the duration, the medium 3 is heated by a heater (not shown) to fully develop the colors and prevent aging.

The lead screws 131 are further turned to make the medium 3 discharge onto a discharge tray (not shown) via a feed belt (not shown) in ascending order.

Corners 146 and 147 on the feed path of the printer 1 constructed as described above are formed to curve at a curvature corresponding to a shape and dimensions of the apparatus housing 100. The corner 146 and 147 has one or a plurality of urging rollers provided for urging the medium 3. The embodiment has one urging roller 148 disposed inside the corner 146 and has two urging rollers 149 and 150 disposed inside the corner 147. The urging rollers 148, 149, and 150 are structured to urge the medium 3 outward from the printing surface 3a side when the medium 3 passes the corners 146 and 147. If the printing surface 3a is urged directly on the printing area thereof, the printing surface 3a is injured. To avoid this, the urging rollers 148, 149, and 150 in the embodiment are arranged to urge (press) edges surrounding the printing area of the printing surface 3a at specific urging forces. It should be noticed that the urging force can be optimized depending on the type of medium 3, the feed speed, and the curvatures of the corners.

The injuries on the medium 3a are virtually not distinctive if the urging rollers 148, 149, and 150 have no sharp edges on portions, or ends thereof, contacting the medium 3 and if the rollers are made of comparatively soft material. In such a case, the urging rollers 148, 149, and 150 can be urged on the printing area of the medium 3a. Such a structure provides the advantages that the medium 3 of different width can be passed and that the medium 3 can be fed normally even with poor edge positioning accuracy due to possible feed skew.

The structure in the embodiment has the advantage that the medium 3 can pass the corners 146 and 147 stably without deviation in the feed direction while the medium 3a is protected. The edges of the medium 3 have no problem for scarring due to the urging rollers since they are cut out by the cutting arrangement 72.

The following describes operation of the Cycolor printer configured as described above briefly.

When printing is started in the state that the media cassette 5 is loaded in the cassette room 2, the medium 3 fed from the media cassette 5 by pick roller 101 are fed out one by one to the feed path 51 by the media separating arrangement, including the feed roller 102 and the separating roller 103, before being fed from the pre-stage path 52 to the exposing stage 55. The exposing stage 55 stops the medium 3 once. The exposing projector 60 irradiates light onto the printing surface 3a of the medium 3 on the basis of a desired image pattern, thereby making the exposure process as a preprocess for forming the desired image.

After the exposure process ends, the exposed medium 3 is transferred to the post-stage path 57 with the medium 3a directed up and specifically cleaned by the paired cleaning rollers 115 before being fed through the feed path 62 to the switchback section 64.

The switchback section 64 allows the exposed medium 3 to stay for a time (dark time) enough to fully develop its colors. It should be noticed that the successive medium 3 fed after are made to stay on the feed paths 57 and 62 between the exposing stage 55 and the switchback section 64. After that, the preceding medium 3 is fed back on the feed path 62 again at a specific timing as the paired feed rollers 117 and 118 are controlled to rotate inversely.

The medium 3 fed back on the feed path 62 is fed to the alternative path 121 via the switching gate 120, is guided to the paired pressure developing rollers 68, and is applied with load to the both sides thereof, thereby forming (color-developing) the desired image.

The medium 3 having the development process completed is continued to feed along parts of the surface on one of the paired pressure developing rollers 68 to transfer from the alternative path 121 to the high-speed feed path 124, is checked for paper jamming in the course of feed by the paper jam detecting sensor 127, and is fed to the cutting arrangement 72.

The medium 3 having the four side edges cut out by the cutting arrangement 72 is bleaching-processed (ink-fixing-processed) during passing the bleaching section 77, is discharged to the take-out part (post-heating section 80) on the top left side of the apparatus housing 100. It should be noticed that the medium detecting sensor 129 arranged in front of the upstream side of the post-heating section 80 controls the discharge timing for the medium 3.

As described above in detail, the printer in the embodiment comprises in combination for forming an image on a surface of a recording medium: preprocessing means for preprocessing the surface of the recording medium to form an image on the surface of the recording medium; post-processing means for post-processing the surface of the recording means preprocessed by the preprocessing means to form the image on the surface of the recording medium; a recording medium feed path formed between the preprocessing means and the post-processing means; first feed device arranged on an upstream side of the recording medium feed path; and, second feed device arranged on a downstream side of the recording medium feed path; wherein the first feed device and the second feed device are made different in driving control from each other. Thus, the printer can print a plurality of recording medium successively that no large-scale arrangements are provided for printing processes to meet a required printing accuracy and to shorten a processing time.

In particular, the printer further comprises a switchback section for substantially extending the recording medium feed path wherein the second feed device is provided in the switchback section. The switchback section has a switchback path installed therein vertically and the second feed device is arranged on the switchback path and has a switchback driving arrangement for independently driving the second feed device. Therefore, the printer can be built up at low price as suppressing apparatus manufacturing costs with use of simple feed driving arrangements and controls. With the switchback path arranged, the medium 3 discharged onto a discharge tray (not shown) after printing is finished can be checked without turning it over as the media surface 3*a* appears up.

Further, the feed speed of the medium 3 fed by the plurality of feed means arranged on the feed path for the medium 3 is optimized for driving control. The printer does not make the feed path for the recording medium long to prevent the apparatus from becoming large while securing a stabilizing time (dark time) until the photosensitive reaction in the microcapsules of the medium 3 stabilizes.

With use of the structures described above, as a result, pressure destruction of the microcapsules by the paired pressure developing rollers 68 in the developing section can be made stably and securely, thereby improving quality of the medium 3*a*.

Further, the printer 1 in the embodiment has the urging rollers 148, 149, and 150 disposed on the corners 146 and 147 of the feed path for urging the edges of the medium 3*a* of the medium 3. It is advantageous that the medium 3 can pass the corners 146 and 147 stably without deviation in the feed direction while the medium 3*a* is protected.

The present invention is not limited to the embodiment described above, but can be modified in many ways as follows.

In the embodiment, the switching gate 120 in the switchback section 64 is driven by the actuator 145 to rotate. Instead, for example, the switching gate 120 may be made up of an elastic material. In that case, the feed path should be switched over by the elastic deformation of the elastic material by linear motion of actuator 145.

In place of the switchback section 64, an additional feed path similar to the feed path 62 may be provided in parallel with the feed path 62 to have different driving controls for the feed rollers arranged on the respective feed paths. In that case, it is preferable that a switching gate should be disposed at a branch point of the feed paths to guide the medium 3 from the media cassette 57 to either of the feed path 62 or the feed path arranged in place of the switchback section 64.

The embodiment of the present invention has been described in detail with the example of Cycolor type printer suitable for the Cycolor film as a photosensitive recording sheet. The present invention can also be embodied for printers of other different types.

What is claimed is:

1. A printer, comprising:
   an exposing section for exposing light as preprocessing on a surface of a recording medium in a form of a separated sheet to form an image on said surface thereof;
   a developing section for development by pressing said surface of said recording medium preprocessed by said exposing section to form said image on said surface of said recording medium;
   a recording medium feed path having a main section formed between said exposing section and said developing section, and a switchback section extending from the main section for extending a length of the main section;
   first feed means arranged on an upstream side of said recording medium feed path for continuously feeding the recording medium from the exposing section at a first speed; and,
   second feed means arranged on a downstream side of said recording medium feed path for continuously feeding the recording medium from the first feeding means to the developing section at a second speed, said second feed means being actuated separately from the first feed means so that the second speed is different from the first speed.

2. The printer according to claim 1, wherein said second feed means is operated while said first feed means is stopped, thereby feeding a preceding recording medium to said developing section.

3. The printer according to claim 1, wherein said second feed means is provided in said switchback section.

4. The printer according to claim 3, wherein said switchback section has a switchback path arranged vertically and said second feed means is arranged on said switchback path and has a switchback driving device for independently driving said second feed means.

5. The printer according to claim 1, further comprising a switching gate provided between said first feed means and said second feed means on said recording medium feed path for switching a feed direction for said recording medium, said switching gate being movable between a first position for guiding said recording medium fed by said second feed means to said developing section and a second position for opening said upstream side and said downstream side on said recording medium feed path for allowing said recording medium to be transferred from said first feed means to said second feeding means.

6. The printer according to claim 1, wherein said developing section has a pressure roller for pressing said recording medium at a specific pressure and for feeding said recording medium, and a feed speed of said recording medium fed by said pressure roller is slower than feed speeds of said recording medium fed by said first and second feed means.

7. The printer according to claim 6, further comprising a cutting section for cutting edges of said recording medium developed by said developing section and third feed means for feeding to said cutting section said recording medium developed by said developing section, wherein a feed speed of said recording medium fed by said third feed means is faster than the feed speed of said recording medium fed by said pressure roller.

8. The printer according to claim 7, wherein said feed speed of said recording medium fed by said first feed means is substantially same as said feed speed of said recording medium by said third feed means.

9. The printer according to claim 1, further comprising cleaning means for cleaning the surface of the recording medium preprocessed by the exposing section, said cleaning means being formed on the upstream side of the recording medium feed path.

10. The printer according to claim 1, further comprising another feed path for transferring the recording medium after the recording medium is processed by the developing section, said switch back section being located at one side of said another feed path adjacent thereto.

11. The printer according to claim 10, wherein said first feed means is located along the main section, and the second feed means is located along the switchback section.

12. A printer comprising:
   preprocessing means for preprocessing a surface of a recording medium in a form of a separated sheet to form an image on said surface thereof;
   post-processing means for post-processing said surface of said recording medium preprocessed by said preprocessing means to fix said image on said surface of said recording medium;

a recording medium feed path having a main section formed between said preprocessing means and said post-processing means and a switchback section extending from the main section for extending a length of the main section;

first feed means arranged on an upstream side of said recording medium feed path for continuously feeding the recording medium from the preprocessing means at a first speed;

second feed means arranged on a downstream side of said recording medium feed path for continuously feeding the recording medium from the first feeding means to the post-processing means at a second speed, said second feed means being actuated separately from the first feed means so that the second speed is different from the first speed; and a switching gate provided between said first feed means and said second feed means on said recording medium feed path for switching a feed direction for said recording medium, said switching gate being movable between a first position for guiding said recording medium fed by said second feed means to said post-processing means and a second position for opening said upstream side and said downstream side on said recording medium feed path for allowing said recording medium to be transferred from said first feed means to said second feeding means, wherein said second feed means comprises a reversible feed roller and said switching gate is positioned at said first position in synchronous with either of normal or reverse rotation of said feed roller.

* * * * *